US012565287B2

(12) United States Patent      (10) Patent No.:    US 12,565,287 B2

Feng et al.              (45) Date of Patent:       Mar. 3, 2026

(54) ELECTRICAL CONNECTOR FOR DETACHABLE INSTALLATION IN BICYCLE FRAME AND BICYCLE CORE SHAFT ASSEMBLY HAVING ELECTRICAL CONNECTOR

(71) Applicant: J.D COMPONENTS CO., LTD., Chang Hua Hsien (TW)

(72) Inventors: Pin-Chieh Feng, Chang Hua Hsien (TW); Chia-Hung Hsu, Chang Hua Hsien (TW); Shih-Wei Nien, Chang Hua Hsien (TW)

(73) Assignee: J.D COMPONENTS CO., LTD., Chang Hua Hsien (TW)

( * ) Notice: Subject to any disclaimer, the term of this patent is extended or adjusted under 35 U.S.C. 154(b) by 463 days.

(21) Appl. No.: 18/337,681

(22) Filed: Jun. 20, 2023

(65) Prior Publication Data

US 2023/0406446 A1     Dec. 21, 2023

(30) Foreign Application Priority Data

Jun. 20, 2022    (TW) ................................. 111122849
   Dec. 5, 2022    (TW) ................................. 111146630

(51) Int. Cl.
    B62M 6/65        (2010.01)
    H01R 13/73      (2006.01)

(52) U.S. Cl.
    CPC .............. B62M 6/65 (2013.01); H01R 13/73 (2013.01); *H01R 2201/26* (2013.01)

(58) Field of Classification Search
    CPC ....... B62M 6/65; B62M 6/40; B60L 2200/12; B60L 2220/44; B60K 1/00; B60K 2001/006

(Continued)

(56) References Cited

U.S. PATENT DOCUMENTS 6,605,884 B2 *   8/2003   Nishimoto ............. H02K 5/225
                                        301/124.1
8,405,263 B2 *   3/2013   Ando ................... H02K 7/1846
                                        310/67 A (Continued)

FOREIGN PATENT DOCUMENTS

CN        203800771 U   *   8/2014
CN        215098091 U   *   12/2021
FR         3083205 A1     1/2020

*Primary Examiner* — Paul N Dickson
*Assistant Examiner* — Matthew D Lee
(74) *Attorney, Agent, or Firm* — MUNCY, GEISSLER, OLDS & LOWE, P.C.

(57)             ABSTRACT

The present invention illustrates an electrical connector for detachable installation in a bicycle frame, which is detachably installed in a lower fork of a bicycle frame and includes a fixed seat and an inserted seat. The fixed seat is installed in the aforementioned lower fork. The fixed seat is hollow in shape. The inserted seat is inserted in the fixed seat movably back and forth. The inserted seat has a first end surface, a second end surface opposite to the first end surface, and a core shaft installation hole penetrating through the first and second end surfaces. The first end surface of the inserted seat is provided with a set of electrically conductive structure. As a result, when a wheel hub motor is installed on the bicycle frame, the electrical connector is able to be pushed to be electrically connected with the wheel hub motor as needed.

14 Claims, 19 Drawing Sheets

(58) Field of Classification Search
USPC .... 180/65.1, 65.51, 218, 219, 220, 223, 224
See application file for complete search history.

(56) References Cited

U.S. PATENT DOCUMENTS

| 2005/0037633 | A1* | 2/2005 | Endo | .................... | H01R 13/506 |
| | | | | | 310/67 A |
| 2016/0075225 | A1* | 3/2016 | Aich | .................... | B60K 7/0007 |
| | | | | | 180/206.6 |
| 2023/0082259 | A1* | 3/2023 | Anton | ...................... | B62M 6/65 |
| | | | | | 180/206.6 |
| 2025/0286430 | A1* | 9/2025 | Yao | ........................ | H02K 5/225 |
| 2025/0300525 | A1* | 9/2025 | Hsu | ........................ | H02K 7/116 |

\* cited by examiner

ELECTRICAL CONNECTOR FOR DETACHABLE INSTALLATION IN BICYCLE FRAME AND BICYCLE CORE SHAFT ASSEMBLY HAVING ELECTRICAL CONNECTOR

BACKGROUND OF THE INVENTION

1. Field of the Invention

The present invention relates to an electrical connector and specifically speaking, to an electrical connector for detachable installation in a bicycle frame, which can attain that when a wheel hub motor is installed on the lower fork of the bicycle frame, the electrical connector of the bicycle frame assembly will not be directly electrically connected with the electrical connector of the wheel hub motor.

2. Description of the Related Art

The traditional electrically power assisted bicycle obtains the power for advance from the pedaling power of the rider in coordination with the assisted power provided by a power outputting mechanism, such as a wheel hub motor, so that the electrically power assisted bicycle will not cause an overlarge burden to the physical strength of the rider, and can achieve the effect of fitness in addition to leisure.

In usual conditions, the bicycle frame of the electrically power assisted bicycle needs to be arranged with proper wiring, not only for the electric power of the battery installed at another position of the bicycle frame to be transmitted to the wheel hub motor, but also for the signals of the wheel hub motor, such as motor output power, motor torque and rotary speed, to be transmitted to another device on the bicycle frame, such as a bicycle meter, so as to improve the manipulation during the ride.

The known French Patent Publication No. 3083205 disclosed a structure of an electrically power assisting motor for the application to an electrically power assisted bicycle. Referring to FIG. 1 of the figures thereof particularly, it can be seen that the electrically power assisting motor 4 of the aforementioned patent is provided with a set of fastening assembly 11. When the electrically power assisting motor 4, including the fastening assembly 11 thereof, is installed on a bicycle frame 2, not only the electrically power assisting motor 4 will be mechanically connected with the bicycle frame 2 directly, but meanwhile the electrical connector 411 of the electrically power assisting motor 4 will be also electrically connected with the electrical connector 2311 of a foot 21 of the bicycle frame 2 directly.

SUMMARY OF THE INVENTION

It is one of the objectives of the present invention to provide a brand-new structural configuration of an electrical connector for detachable installation in a bicycle frame. When a motor is installed on the lower fork of the bicycle frame, the electrical connector of the bicycle frame assembly will not be electrically connected with the electrical connector of the motor directly.

Therefore, the present invention provides an electrical connector for detachable installation in a bicycle frame, which is detachably installed in a lower fork of a bicycle frame, and includes a fixed seat and an inserted seat. The fixed seat is installed in the lower fork. The fixed seat is hollow in shape. The inserted seat is inserted in the fixed seat in a way that the inserted seat is movable back and forth. The inserted seat has a first end surface, a second end surface opposite to the first end surface, and a core shaft installation hole penetrating through the first end surface and the second end surface. The first end surface of the inserted seat is further provided with a set of electrically conductive structure.

As a result, when the user installs a wheel hub motor on the bicycle frame, the electrical connector is not electrically connected with the wheel hub motor yet. After that, the user can freehand push the inserted seat of the electrical connector, or use another tool, such as a quick-release core shaft to be described in the paragraphs herein below, to push the inserted seat of the electrical connector, for the electrical connection with the wheel hub motor. Therefore, in the process of the installation of the wheel hub motor on the bicycle frame, the electrical connector on the bicycle frame will not be electrically connected with the electrical connector of the wheel hub motor directly. When the electrical connection is needed, then the user pushes the inserted seat to connect it with the electrical connector of the wheel hub motor, so as to complete the electrical connection of the two.

BRIEF DESCRIPTION OF THE DRAWINGS

The detailed structure, features, assembly or usage manner of the electrical connector for detachable installation in a bicycle frame will be described in the following embodiments. However, it should be understandable that the embodiments and the accompanying drawings to be described herein below are given by way of illustration only, not limitative of the claims of the present invention, and wherein:

DETAILED DESCRIPTION OF THE INVENTION

First of all, it is to be mentioned that the technical features provided by the present invention are unlimited to the specific structure, usage and application thereof described in the detailed description of the invention. It should be understood by those skilled in the related art that all the terms used in the content of the specification are for illustrative description. The directional terms mentioned in the content of the specification, such as 'front', 'upper', 'lower', 'rear', 'left', 'right', 'top', 'bottom', 'in', and 'out', are also just for illustrative description on the basis of normal usage direction, not intended to limit the claimed scope.

For the detailed description of the technical features of the present invention, two embodiments are instanced herein below and described in coordination with the accompanying drawings.

Figure 1:
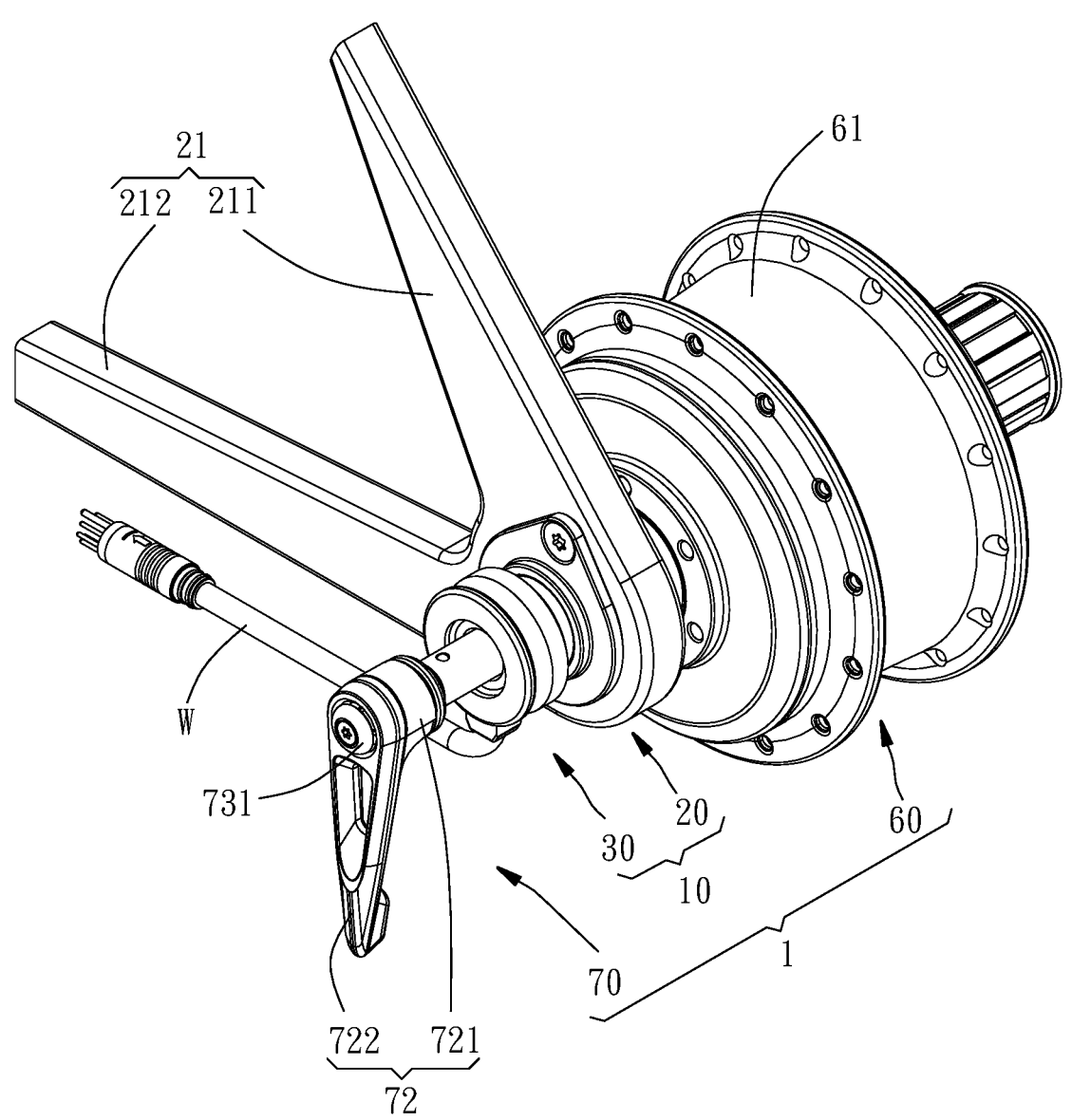
FIG. 1 is an assembled perspective view of an electrical connector for detachable installation in a bicycle frame of a first embodiment of the present invention, together with a wheel hub motor and a quick-release core shaft.

As shown in FIG. 1, the first embodiment provides an assembly 1 of an electrical connector for detachable installation in a bicycle frame, a wheel hub motor and a quick-release core shaft, which includes a bicycle frame assembly 10, a wheel hub motor 60 and a quick-release core shaft 70.

Figure 2:
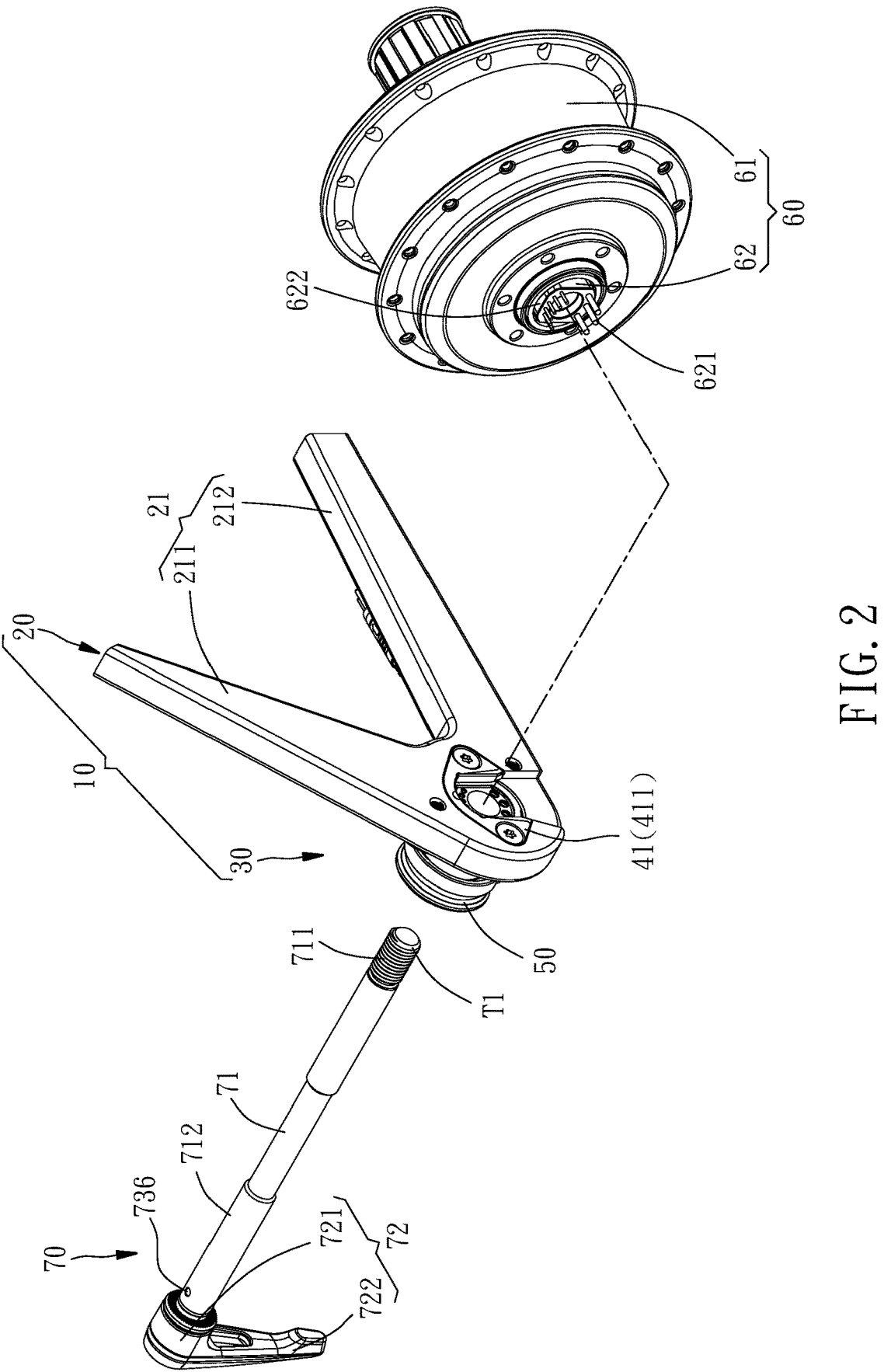
FIG. 2 is an exploded view of FIG. 1.
Figure 3:
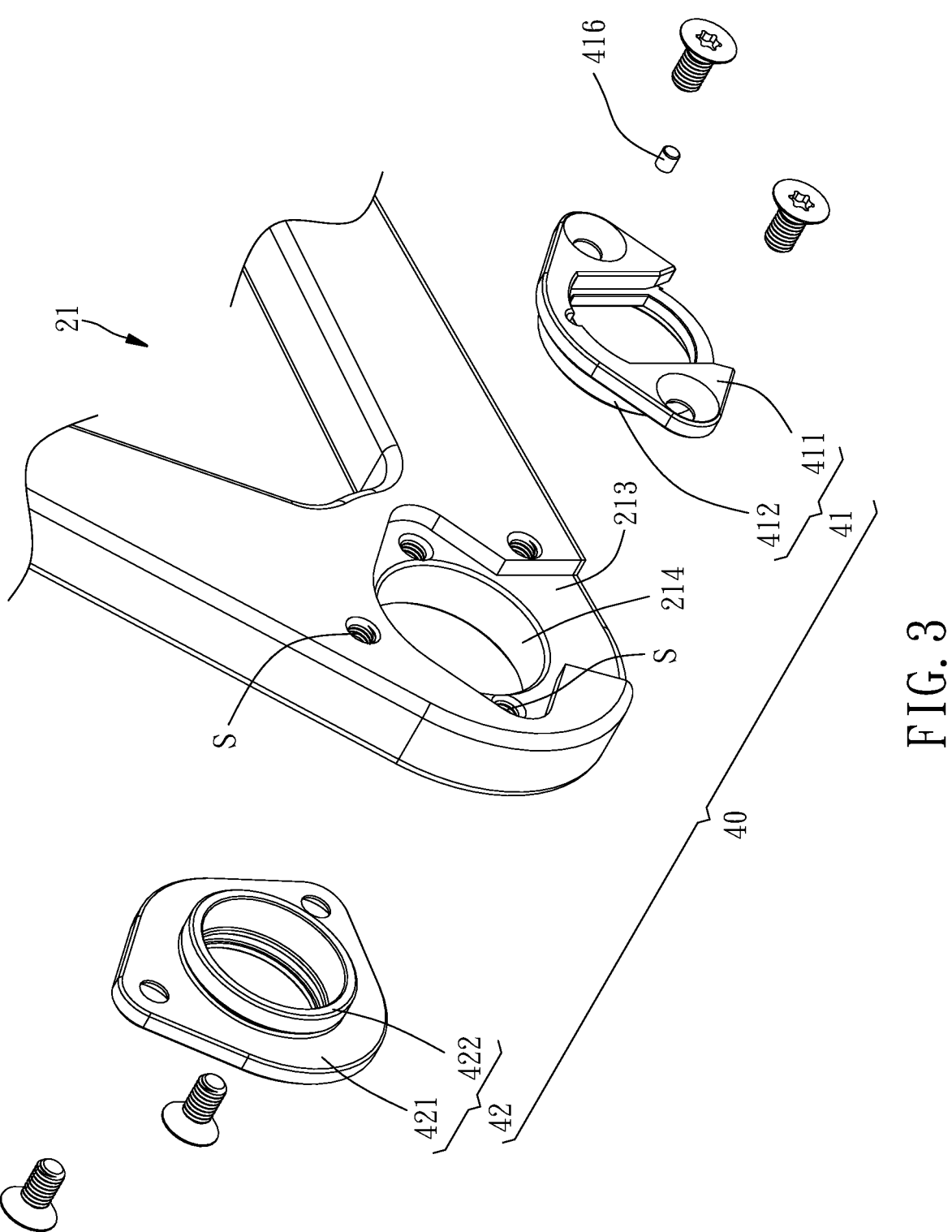
FIG. 3 is an exploded view of a bicycle frame assembly, but an inserted seat of a first electrical connector is omitted.
Figure 4:
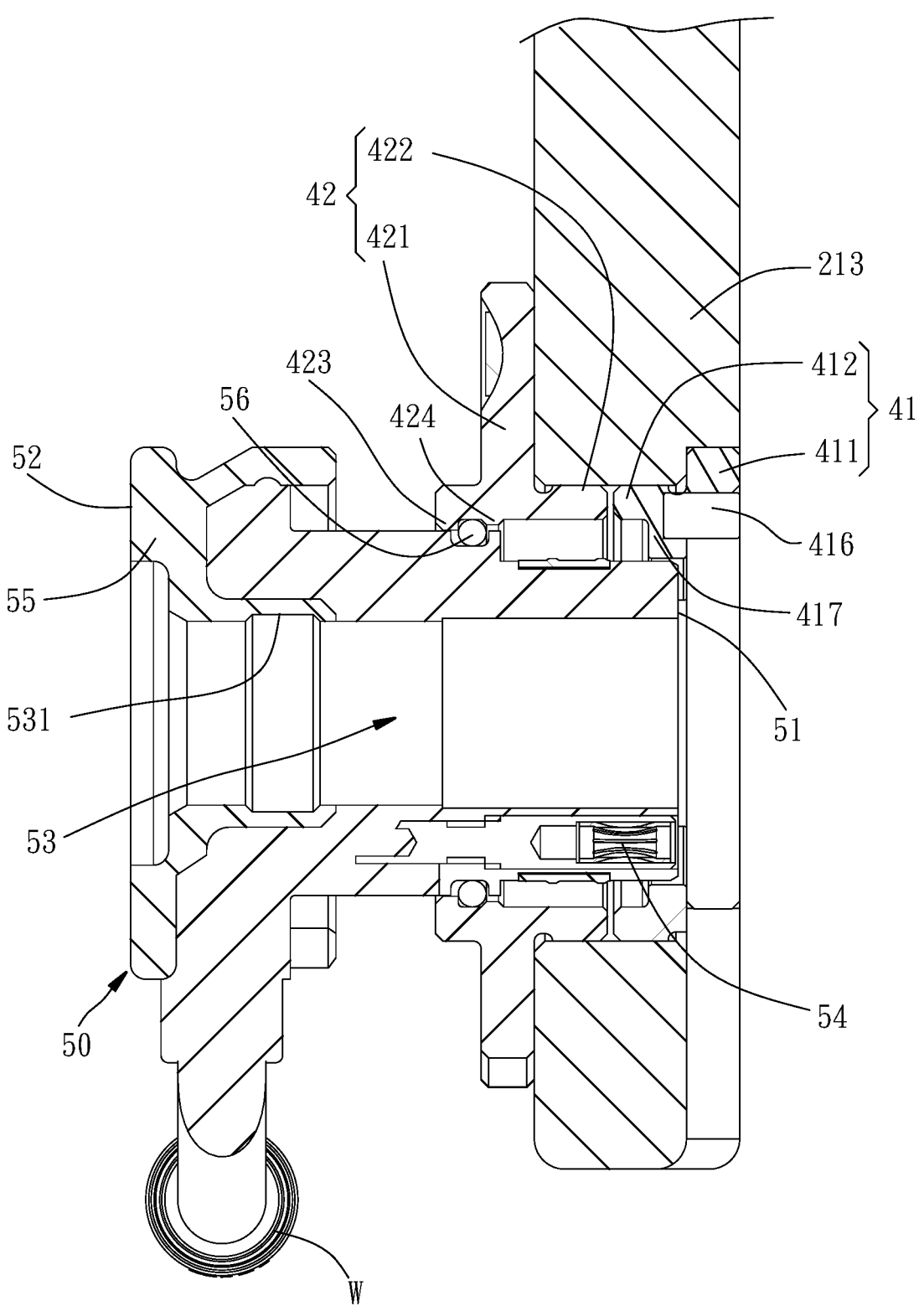
FIG. 4 is a sectional view of the bicycle frame assembly of the first embodiment of the present invention.

As shown in FIG. 2 to FIG. 4 and FIG. 7A, the bicycle frame assembly 10 includes a bicycle frame 20 and a first electrical connector 30. The bicycle frame 20 includes a lower fork. The aforementioned lower fork in this embodiment is a rear fork. The rear fork includes a left rear fork 21 and a right rear fork. The left rear fork 21 and the right rear fork are approximately the same in structure. This embodiment only describes the left rear fork 21, and the right rear fork can be deduced from this. Besides, in this embodiment, the lower fork may be a front fork. Therefore, it should be unlimited to this embodiment. The left rear fork 21 and the right rear fork are both provided with a rear wheel installation portion 213. The left rear fork 21 includes a left rear upper fork 211 and a left rear lower fork 212. The rear wheel installation portion 213 of the left rear fork 21 is connected between the left rear upper fork 211 and the left rear lower fork 212. The rear wheel installation portion 213 is provided with a through hole 214 as shown in FIG. 3, and some threaded holes S. The through hole 214 of the rear wheel installation portion 213 is arranged for the quick-release core shaft 70 to pass therethrough to make the wheel hub motor 60 installed between the left rear fork 21 and the right rear fork of the bicycle frame 20. The threaded holes S of the rear wheel installation portion 213 are arranged for the first electrical connector 30 to be fixed to the left rear fork 21, and this part will be described in the paragraphs herein below.

Figure 5A:
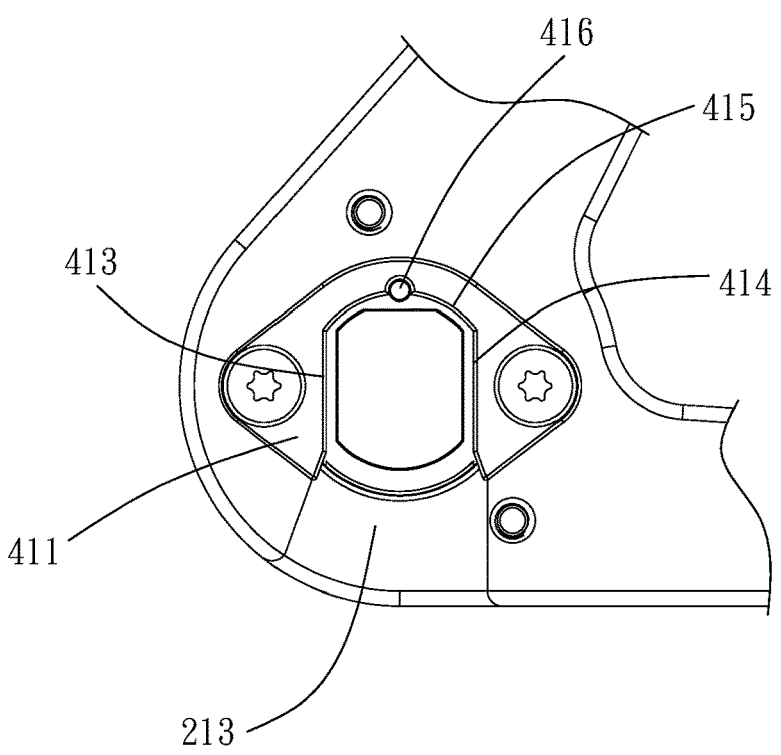
FIG. 5A and FIG. 5B are partial side views of the bicycle frame assembly.

The first electrical connector 30 is detachably installed in the lower fork of the bicycle frame 20, and includes a fixed seat 40 and an inserted seat 50. The fixed seat 40 structurally includes a first fixed member 41 and a second fixed member 42. The first fixed member 41 and the second fixed member 42 are both provided with some holes so that the first fixed member 41 and the second fixed member 42 can be fastened to two opposite sides of the rear wheel installation portion 213 of the left rear fork 21 (or right rear fork) by screws. The first fixed member 41 and the second fixed member 42 are both hollow in shape. The first fixed member 41 includes an electrical connector engaging portion 411 and a first annular inserted portion 412. The electrical connector engaging portion 411 is integrally connected with the first annular inserted portion 412, and located on a side of the fixed seat 40 facing toward the wheel hub motor 60. Specifically, as shown in FIG. 5A, the electrical connector engaging portion 411 is structurally hollow in shape, and has a first inner wall 413, a second inner wall 414, and an upper inner wall 415 connecting the upper ends of the first inner wall 413 and the second inner wall 414. The first inner wall 413 and the second inner wall 414 are arranged parallel to each other. The upper inner wall 415 is arc in shape. Therefore, an open end is formed by the ends of the first inner wall 413 and the second inner wall 414 away from the upper inner wall 415 collectively, and a closed end is formed by the ends of the first inner wall 413 and the second inner wall 414 close to the upper inner wall 415 collectively. The first annular inserted portion 412 is inserted into the through hole 214 of the rear wheel installation portion 213 of the bicycle frame 20.

Figure 5B:
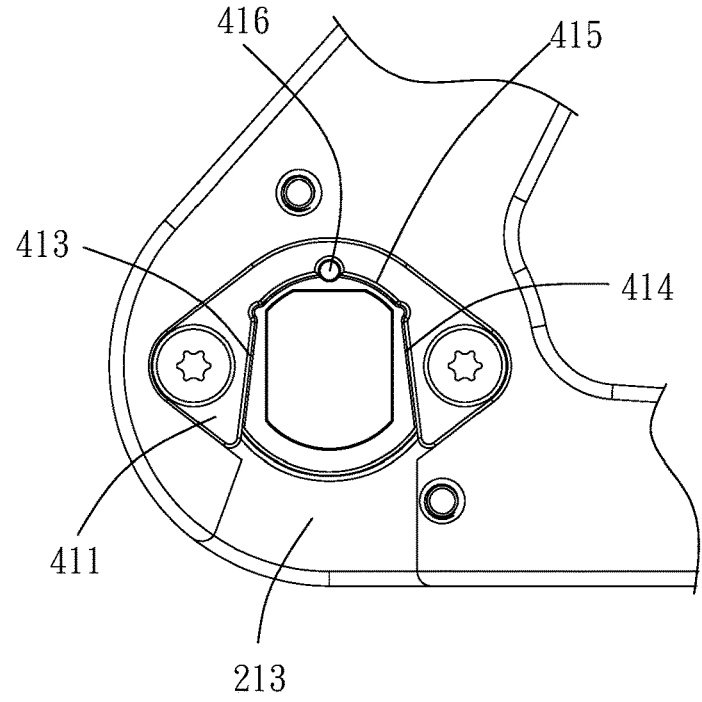

In some situations, the configuration of the electrical connector engaging portion 411 may be slightly modified. As shown in FIG. 5B, the first inner wall 413 and the second inner wall 414 of the electrical connector engaging portion 411 also extend linearly. However, the ends of the first inner wall 413 and the second inner wall 414 close to the upper inner wall 415 are close to each other, and the ends of the first inner wall 413 and the second inner wall 414 away from the upper inner wall 415 are away from each other. In coordination with the configuration design of the electrical connector of the wheel hub motor 60, a fool-proofing design can be attained to prevent the user from installing the wheel hub motor 60 in wrong direction. Besides, no matter the electrical connector engaging portion 411 adopts the configuration as shown in FIG. 5A or the configuration as shown in FIG. 5B, the first fixed member 41 may be additionally installed with a position limiting pin 416, and the position limiting pin 416 is located on the lower side of the upper inner wall 415 and adjacent to the upper inner wall 415, that also helps to form a position limiting and rotation proofing structure to more effectively prevent the user from installing the wheel hub motor 60 in wrong direction.

Referring to FIG. 2 to FIG. 4 and FIG. 7A, the second fixed member 42 structurally includes an outer annular portion 421 and a second annular inserted portion 422. The outer annular portion 421 is integrally connected with the second annular inserted portion 422. The outer annular portion 421 is provided with some threaded holes S. The second annular inserted portion 422 is inserted into the through hole 214 of the rear wheel installation portion 213 of the bicycle frame 20.

The inserted seat 50 is inserted in the fixed seat 40 in a way that the inserted seat 50 is movable back and forth. The inserted seat 50 is hollow in shape, and has a first end surface 51, a second end surface 52 opposite to the first end surface 51, and a core shaft installation hole 53 penetrating through the first end surface 51 and the second end surface 52. The first end surface 51 of the inserted seat 50 is provided with a set of electrically conductive structure 54. The electrically conductive structure 54 is a set of female terminals. The electrically conductive structure 54 is electrically connected to an electric wire W, and the direction of the electrical connection of the electrically conductive structure 54 is parallel to the axis A of the core shaft installation hole 53. The electrically conductive structure 54 is arranged to transmit the power signal the wheel hub motor 60 needs, and transmit each detected signal of the wheel hub motor 60, such as torque signal or rotary speed signal, to the exterior. For enabling the inserted seat 50 to displace back and forth relative to the fixed seat 40, the inserted seat 50 is provided with a gripped portion 55 so that the user can grip the aforementioned gripped portion 55 to pull the inserted seat 50 to move in the direction from the first end surface 51 to the second end surface 52 (vice versa), thereby making the set of electrically conductive structure 54 electrically disconnected. Besides, the core shaft installation hole 53 is provided on the inner wall thereof with an annular pushing groove 531 so that the quick-release core shaft 70 can push the annular pushing groove 531 of the inserted seat 50 to drive the inserted seat 50 to move in the direction from the second end surface 52 to the first end surface 51 (vice versa).

In addition, the first fixed member 41 in this embodiment is provided at an end of the inner wall thereof away from the second fixed member 42 with a first annular flange 417, and the second fixed member 42 is provided at an end of the inner wall thereof away from the first fixed member 41 with a second annular flange 423. The inserted seat 50 is provided on the outer wall surface thereof with an elastic protruding ring 56. The elastic protruding ring 56 is located between the first annular flange 417 and the second annular flange 423, such that when the elastic protruding ring 56 of the inserted seat 50 is located between the first annular flange 417 and the second annular flange 423, the inserted seat 50 is prevented from sliding out of the fixed seat 40. Besides, the second fixed member 42 is further provided on the inner wall thereof with an annular protrusion 424, and the annular protrusion 424 is located between the first annular flange 417 and the second annular flange 423.

Referring to FIG. 2, the wheel hub motor 60 is fixed between the left rear fork 21 and the right rear fork, and connected with the fixed seat 40 of the first electrical connector 30 of the bicycle frame assembly 10. The wheel hub motor 60 structurally includes a motor main body 61 and a second electrical connector 62. The second electrical connector 62 is disposed on a side of the motor main body 61, and the second electrical connector 62 is also provided with electrically conductive structure 621 which is essentially male terminals. The motor main body 61 is arranged to provide electrical assisting power to help the rotation of the rear wheel. The motor main body 61 structurally includes mechanisms such as a stator, a rotor, a reduction mechanism and a motor housing, and this part of mechanisms is well known, thereby not repeatedly described herein.

Figure 7A:
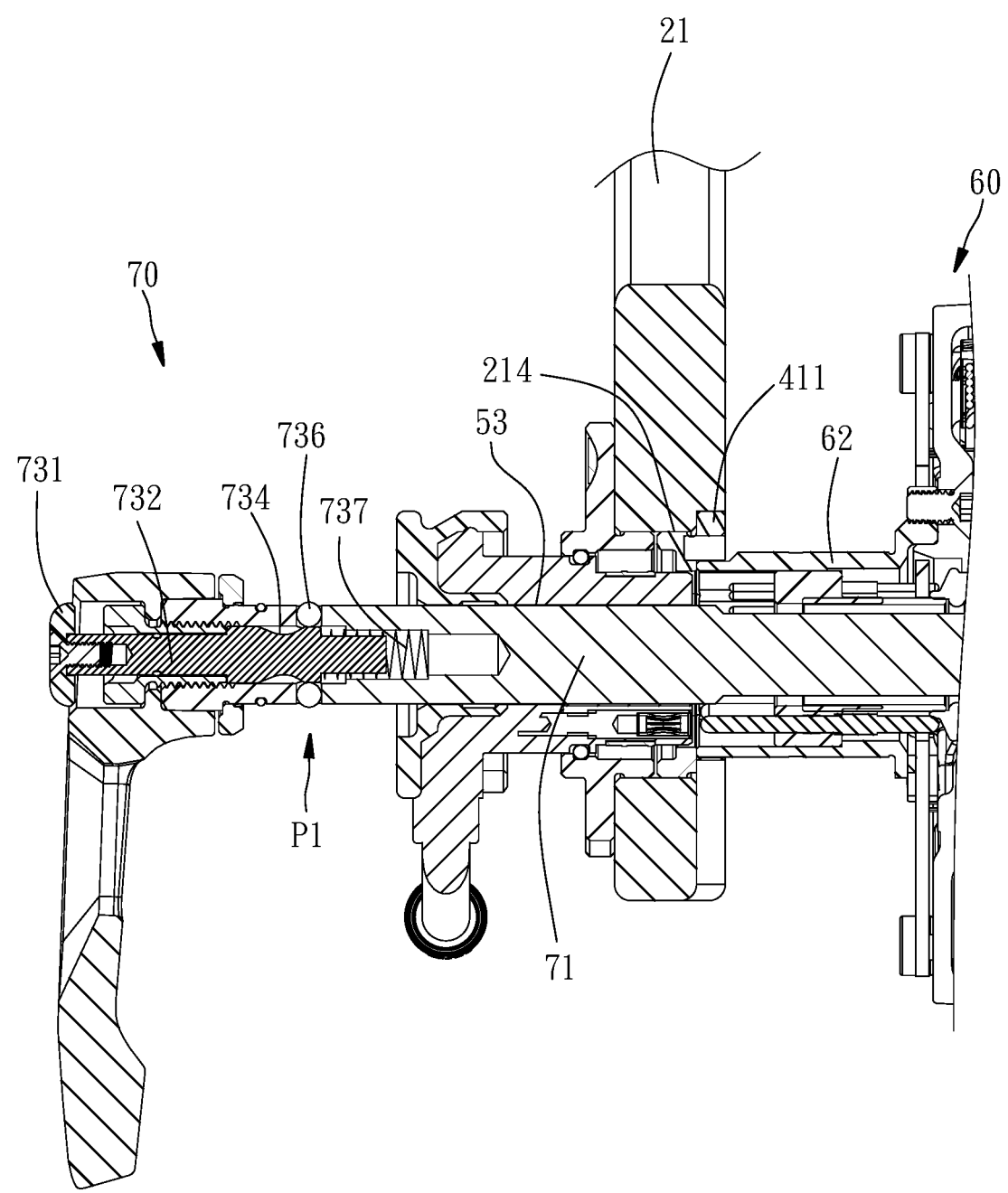
FIG. 7A to FIG. 7G are schematic views showing the motion of the quick-release core shaft pushing the first electrical connector.
Figure 7B:
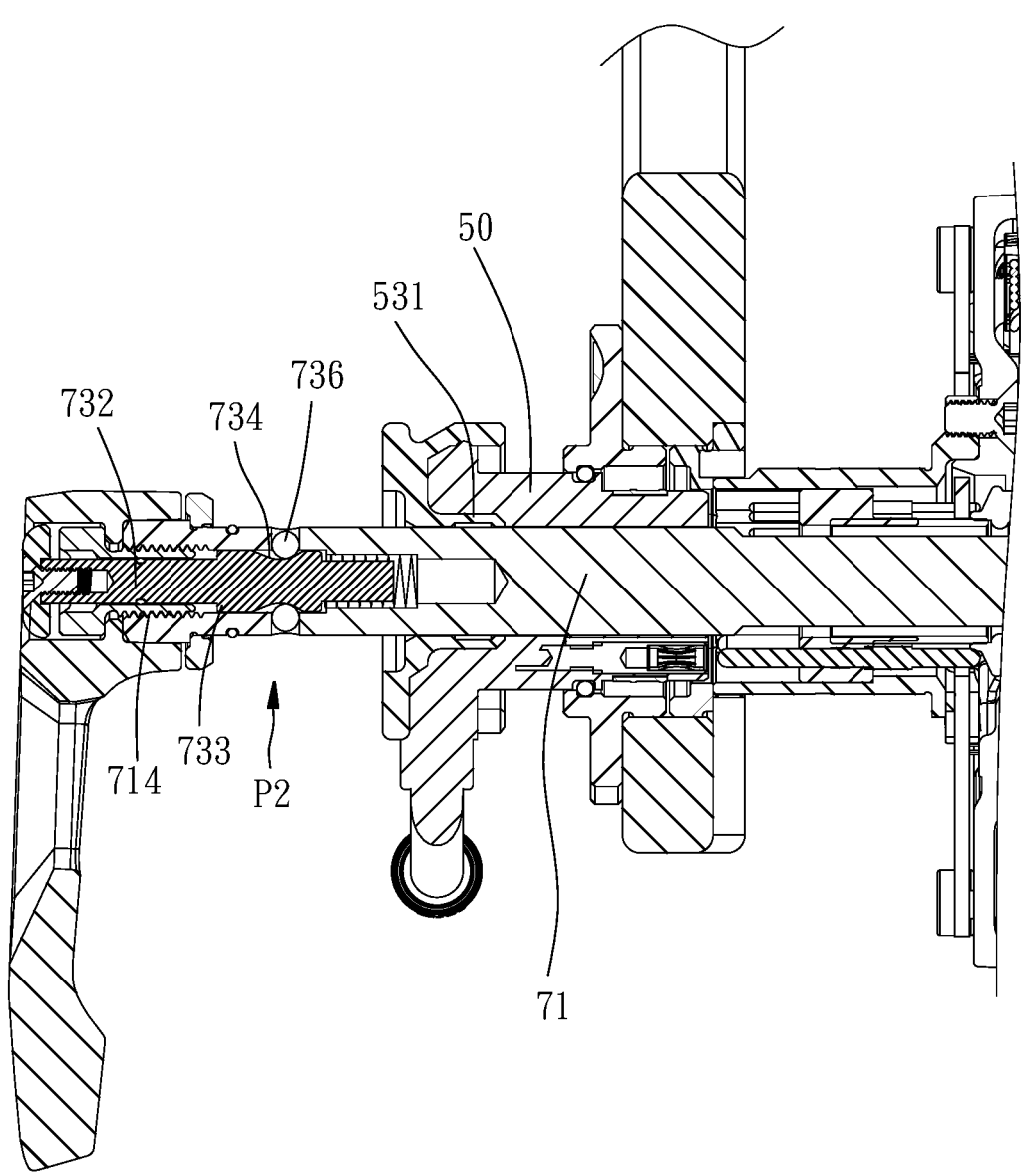
Figure 7C:
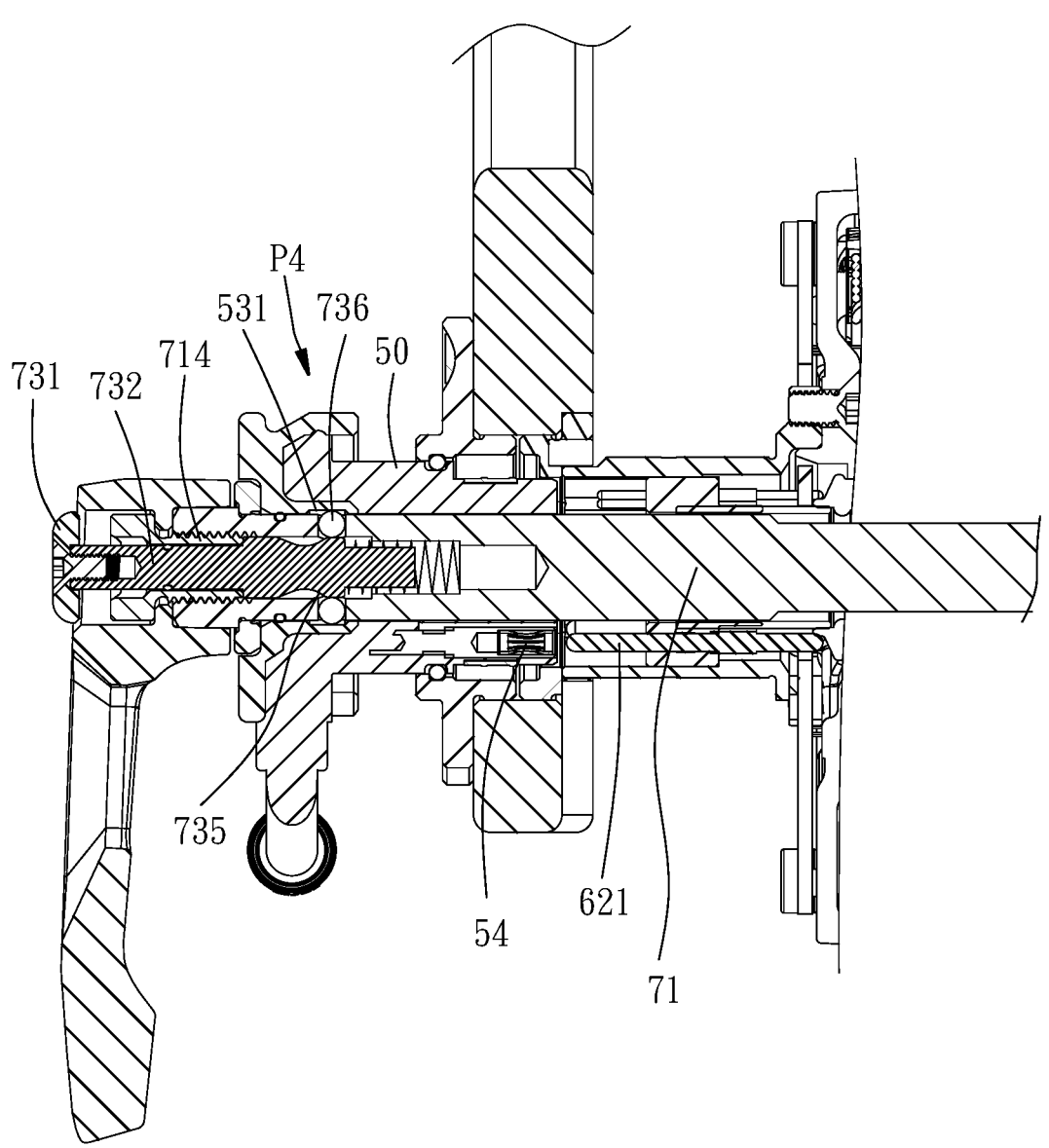
Figure 7D:
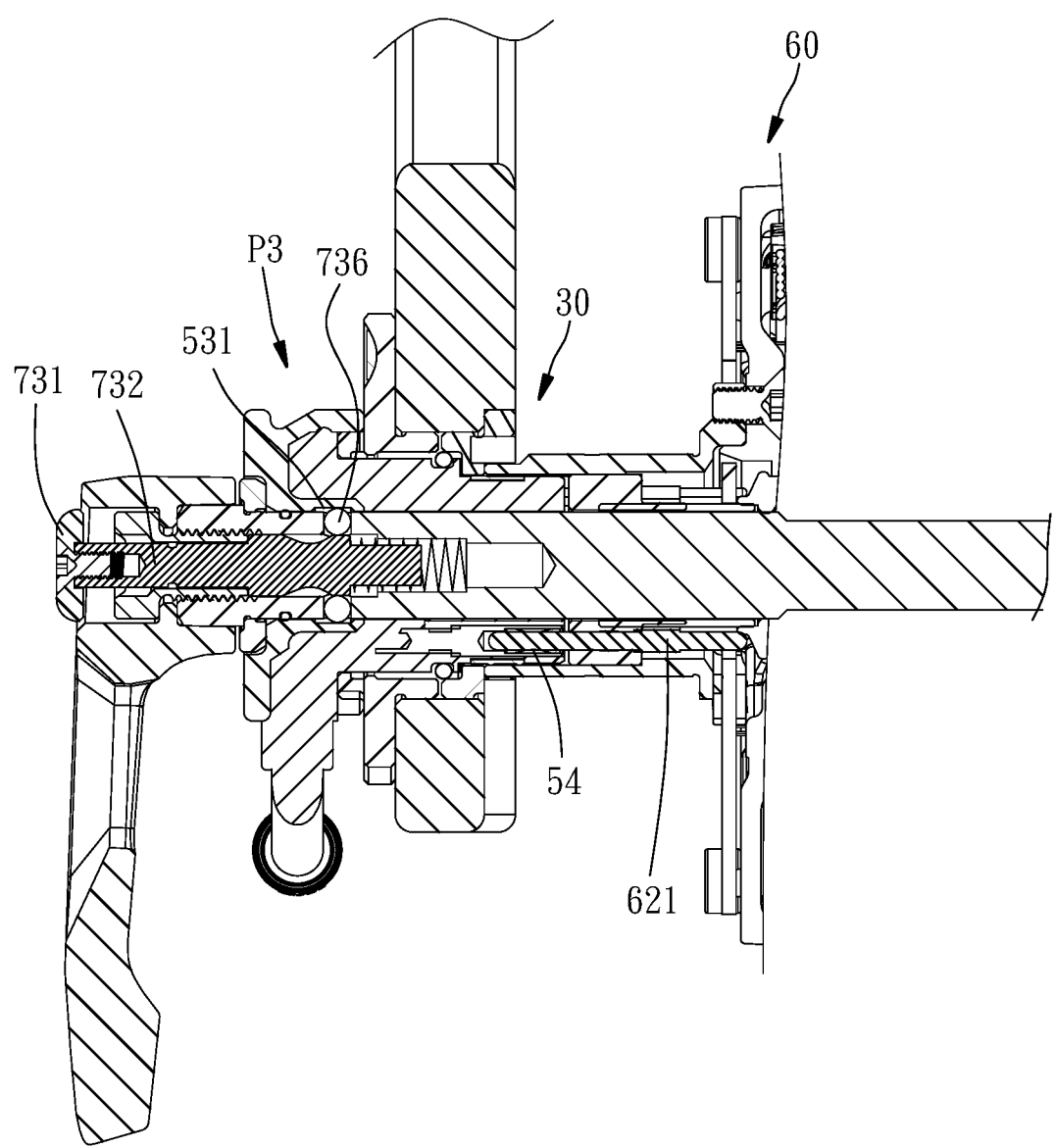

The configuration of the second electrical connector 62 of the wheel hub motor 60 is complementary to the configuration of the electrical connector engaging portion 411 of the fixed seat 40, thereby forming a fool-proofing structure. Besides, the second electrical connector 62 structurally has a stair portion 622. The inserted seat 50 can be driven to move back and forth between an electrically connecting position P3 as shown in FIG. 7D and an electrically disconnecting position P4 as shown in FIG. 7C. When the inserted seat 50 is located at the electrically connecting position P3, the set of electrically conductive structure 54 of the inserted seat 50 is electrically connected with the second electrical connector 62, and the position limiting pin 416 is located at the stair portion 622 of the second electrical connector 62. When the inserted seat 50 is located at the electrically disconnecting position P4, the set of electrically conductive structure 54 of the inserted seat 50 is not electrically connected with the second electrical connector 62.

By the structural configuration of the assembly of the aforementioned bicycle frame assembly 10 and wheel hub motor 60, when the user installs the wheel hub motor 60 on the bicycle frame 20 and uses a quick-release core shaft 70 to fix the wheel hub motor 60, together with the rear wheel, to the bicycle frame 20, the first electrical connector 30 of the bicycle frame assembly 10 is not electrically connected with the wheel hub motor 60 yet. After that, the user can freehand push the gripped portion 55 of the inserted seat 50 of the first electrical connector 30, or use another tool, such as the quick-release core shaft 70 to be described in the paragraphs herein below, to push the inserted seat 50 of the first electrical connector 30, moving the inserted seat 50 to the electrically connecting position P3 as shown in FIG. 7D to make the first electrical connector 30 electrically connected with the wheel hub motor 60. Therefore, in the process of the installation of the wheel hub motor 60 on the bicycle frame assembly 10, the first electrical connector 30 of the bicycle frame assembly 10 will not be electrically connected with the electrical connector of the wheel hub motor 60 directly. When the electrical connection is needed, then the user pushes the inserted seat 50 to connect it with the electrical connector of the wheel hub motor 60, so as to complete the electrical connection of the two.

Figure 6:
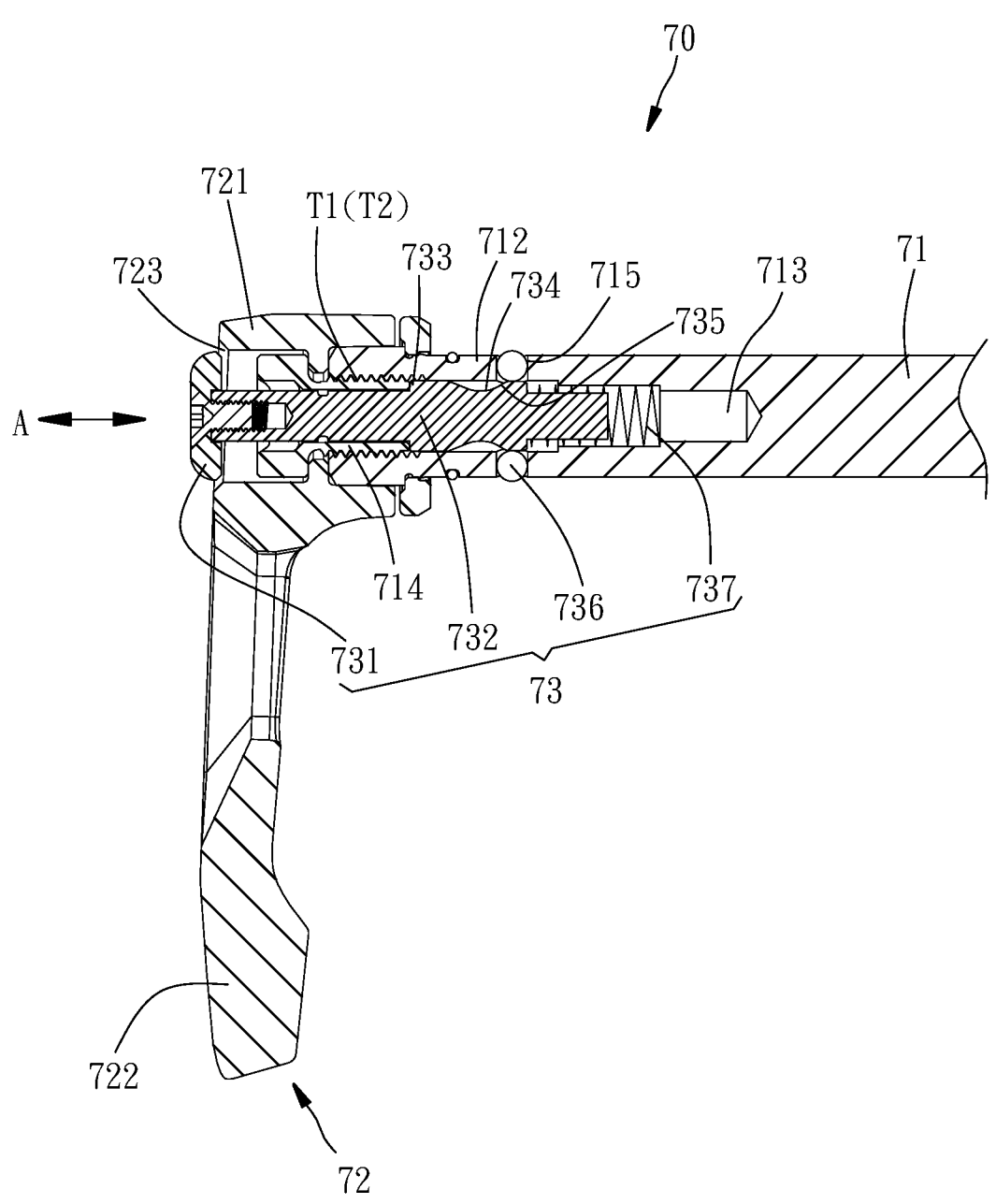
FIG. 6 is a sectional view of the quick-release core shaft of the embodiment of the present invention.

In order to push the first electrical connector 30, this embodiment further illustrates a brand-new design of the quick-release core shaft 70. Referring to FIG. 2 and FIG. 6, the quick-release core shaft 70 structurally includes a shaft rod 71, a driving member 72 and a positioning unit 73.

The shaft rod 71 includes a first end portion 711, and a second end portion 712 opposite to the first end portion 711. The central axis of the shaft rod 71 is defined as an axis A. The first end portion 711 is provided with an external thread structure T1. The second end portion 712 is provided with an axial hole 713, as shown in FIG. 6. The axial hole 713 is provided at the part of the inner wall thereof close to the second end portion 712 with an internal thread structure T2, and the axial hole 713 is provided on the inner wall thereof with a protrusion. In this embodiment, the structure of the protrusion is a stopping pipe 714. The stopping pipe 714 is provided on the outer peripheral surface thereof with an external thread structure T1. The external thread structure T1 of the stopping pipe 714 is screwingly connected with the internal thread structure T2 of the axial hole 713. Besides, the shaft rod 71 is provided on the outer peripheral surface thereof with two through holes 715. The through holes 715 communicate with the axial hole 713.

The driving member 72 is combined with the second end portion 712. In this embodiment, the driving member 72 is a quick-release handle. The quick-release handle includes a sleeve portion 721 and a pulled portion 722. The pulled portion 722 is connected with the sleeve portion 721. The sleeve portion 721 of the quick-release handle is combined with the second end portion 712 of the shaft rod 71. The sleeve portion 721 is provided on the axis A with an opening 723. It should be mentioned that the driving member 72 may be only a simple external hexagonal structure combined with the second end portion 712 of the shaft rod 71 for the user to use a wrench to rotate the shaft rod 71, so the structure of the driving member 72 is unlimited to this embodiment.

The positioning unit 73 is disposed in the axial hole 713, and includes a button 731, a ball pushing rod 732, two balls 736 and an elastic member 737. The button 731 is connected to an end of the ball pushing rod 732. The ball pushing rod 732 is provided on the outer peripheral surface thereof with an abutted portion 733 and a ball accommodating groove 734. The ball accommodating groove 734 is provided with slope 735. The two balls 736 are disposed in two through holes 715 of the shaft rod 71 respectively. It may use only one ball 736, but is better to use two balls 736. The elastic member 737 in this embodiment is a compressed spring. The elastic member 737 is disposed in the axial hole 713 and pushes the ball pushing rod 732 to move toward the stopping pipe 714, so that the abutted portion 733 of the ball pushing rod 732 is abutted against the stopping pipe 714. The ball pushing rod 732 is movable between a first position P1 as shown in FIG. 7A and a second position P2 as shown in FIG. 7B. When the ball pushing rod 732 is located at the first position P1, the balls 736 are pushed by the ball pushing rod 732 to be partially exposed out of the through holes 715. When the ball pushing rod 732 is located at the second position P2, the balls 736 sink into the ball accommodating groove 734 of the ball pushing rod 732 so that the balls 736 are not exposed out of the through holes 715.

The operation manner of the quick-release core shaft 70 in coordination with the bicycle frame assembly 10 is described herein below.

Refer to FIG. 7A to FIG. 7G. As shown in FIG. 7A, when the user installs the wheel hub motor 60 between the left rear fork 21 and the right rear fork, and the second electrical connector 62 of the wheel hub motor 60 is engaged with the electrical connector engaging portion 411 of the fixed seat 40 of the first electrical connector, the user inserts the quick-release core shaft 70 into the core shaft installation hole 53 of the inserted seat 50 of the first electrical connector 30 and it passes through the through hole 214 of the left rear fork 21, the center of the wheel hub motor 60 and the through hole of the right rear fork (not shown). At this time, the user presses the button 731 of the positioning unit 73 to push the ball pushing rod 732 to compress the elastic member 737 until the ball accommodating groove 734 of the ball pushing rod 732 just corresponds in position to the two balls 736 and the two balls sink into the ball accommodating groove 734, as shown in FIG. 7B. At this time, the ball pushing rod 732 is located at the second position P2. After that, in the condition that the balls 736 sink in the ball accommodating groove 734, the user can further move the shaft rod 71 to the right in FIG. 7B until a side of the sleeve portion 721 close to the inserted seat 50 is attached to the inserted seat 50. At this time, the through holes 715 of the shaft rod 71 correspond in position to the annular pushing groove 531 of the inserted seat 50 of the first electrical connector 30, as shown in FIG. 7C, then the user can release the button 731. The elastic restoring force released by the elastic member 737 acts on the ball pushing rod 732 to move it to the left, so that the abutted portion 733 of the ball pushing rod 732 is abutted against the stopping pipe 714 again. With the help of the slope 735 of the ball accommodating groove 734, the two balls 736 partially protrude out of the through holes 715 of the shaft rod 71 again, and are located in the annular pushing groove 531 of the core shaft installation hole 53. After that, the user can push the quick-release core shaft 70 to make the sleeve portion 721 push the inserted seat 50 to move it from the electrically disconnecting position P4 as shown in FIG. 7C to the electrically connecting position P3 as shown in FIG. 7D, so as to complete the electrical connection of the wheel hub motor 60 with the first electrical connector 30.

Figure 7E:
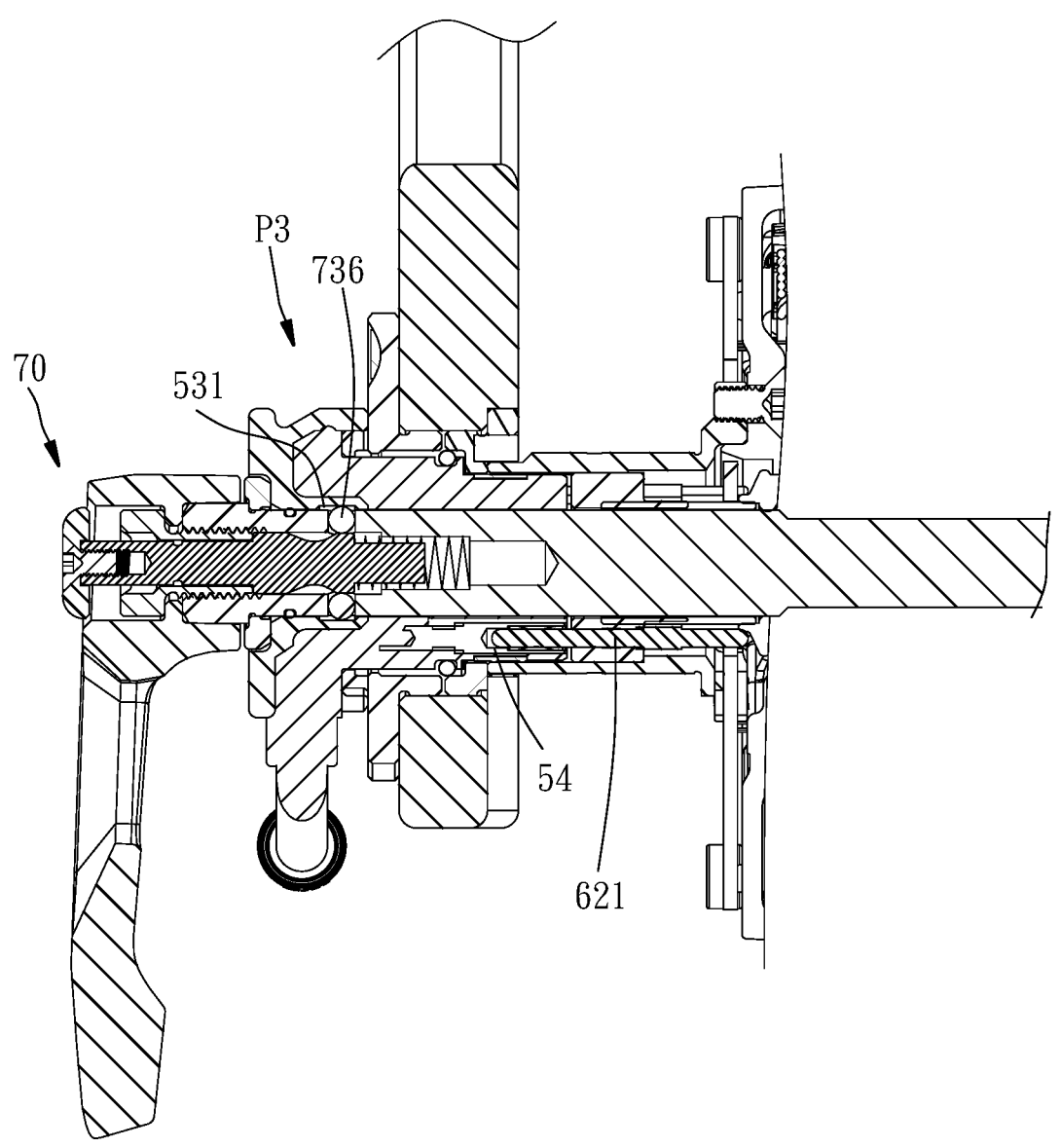
Figure 7F:
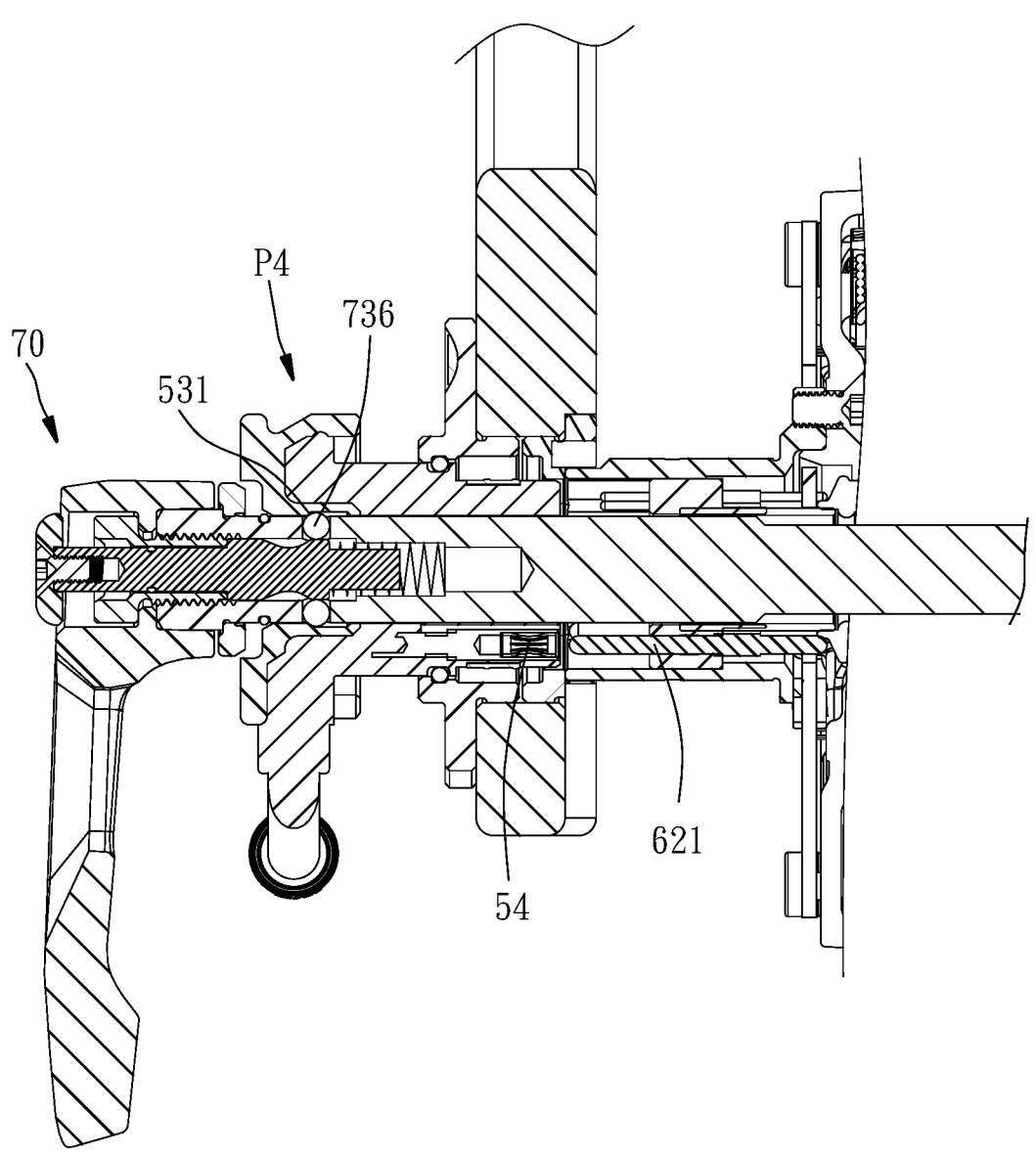
Figure 7G:
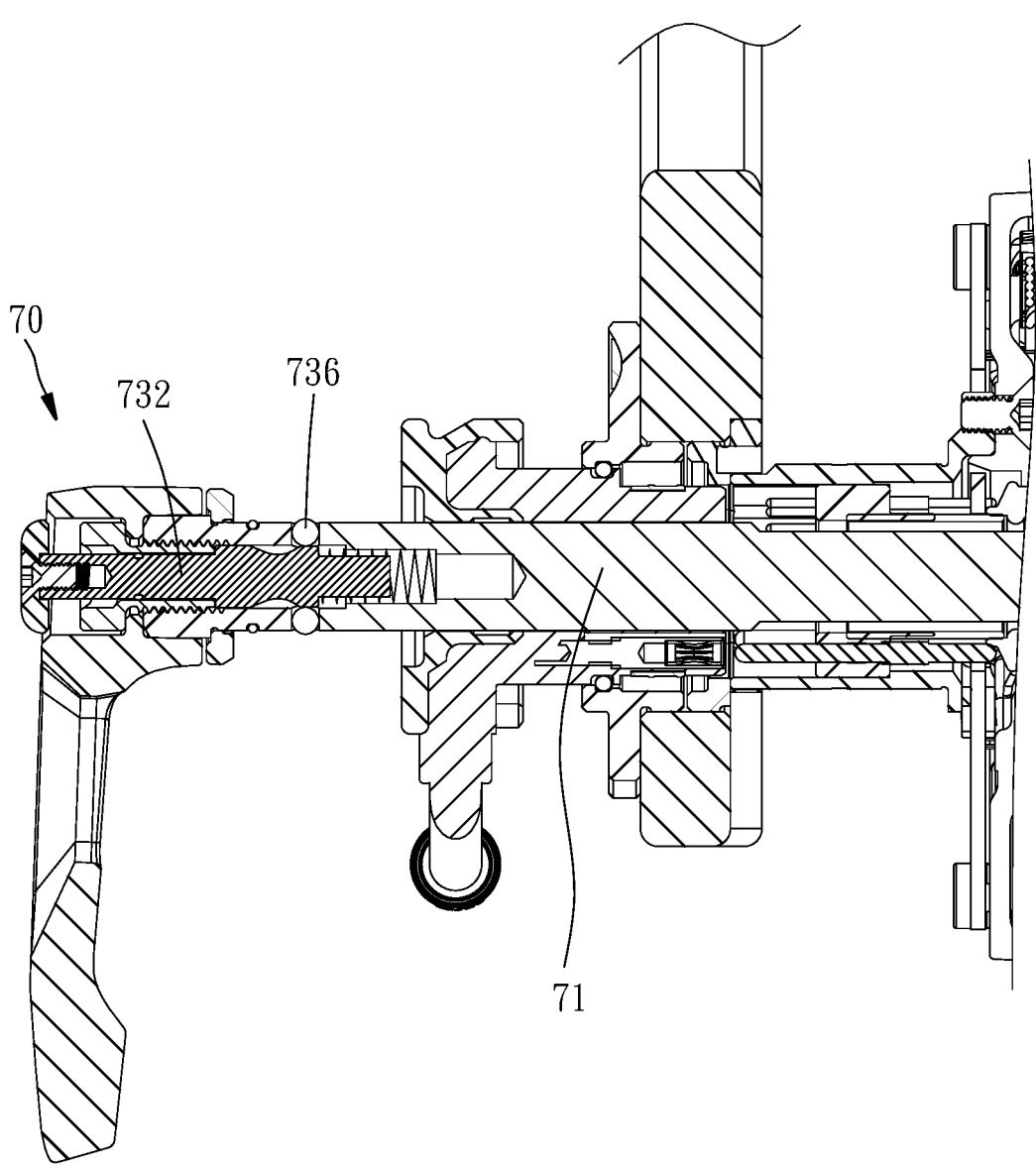

When the user wants to detach the wheel hub motor 60, and meanwhile the inserted seat 50 is still located at the electrically connecting position P3 as shown in FIG. 7E, the user can directly pull the quick-release core shaft 70 to the left, according to the direction in FIG. 7E. By the two balls 736 pushing the inner wall of the annular pushing groove 531, the inserted seat 50 is moved from the electrically connecting position P3 as shown in FIG. 7E to the electrically disconnecting position P4 as shown in FIG. 7F. After that, the user can press the button 731 again to make the two balls 736 sink into the ball accommodating groove 734, and at last further pull out the quick-release core shaft 70, as shown in FIG. 7G, until the quick-release core shaft 70 is completely separated from the bicycle frame assembly 10.

Compared with the conventional bicycle frame assembly and quick-release core shaft, the first electrical connector 30 of the bicycle frame assembly 10 of this embodiment can be applied to the rear fork of the bicycle frame of traditional structure, so the bicycle frame assembly 10 of this embodiment has relatively higher universality. Besides, this embodiment also has the advantage of being relatively more convenient in maintenance. As long as the quick-release core shaft 70 and the first electrical connector 30 of the bicycle frame assembly 10 are detached individually, the user can send the quick-release core shaft 70 and the first electrical connector 30 for repair. At last, in this embodiment, the first electrical connector 30 is pushed manually or through the quick-release core shaft 70 for electrical connection or electrical disconnection. In the condition that the wheel hub motor 60 is not in use, it has no need to be maintained in the electrically connected status all the time. In the condition that the first electrical connector 30 is not in use, it can be also detached, together with the wheel hub motor 60 and the quick-release core shaft 70, not required to keep installed on the bicycle frame 20, so that the first electrical connector 30 and the wheel hub motor 60 are relatively less affected by environmental factors such as falling dust and rain. All of the above are the characteristics of this embodiment.

Figure 8:
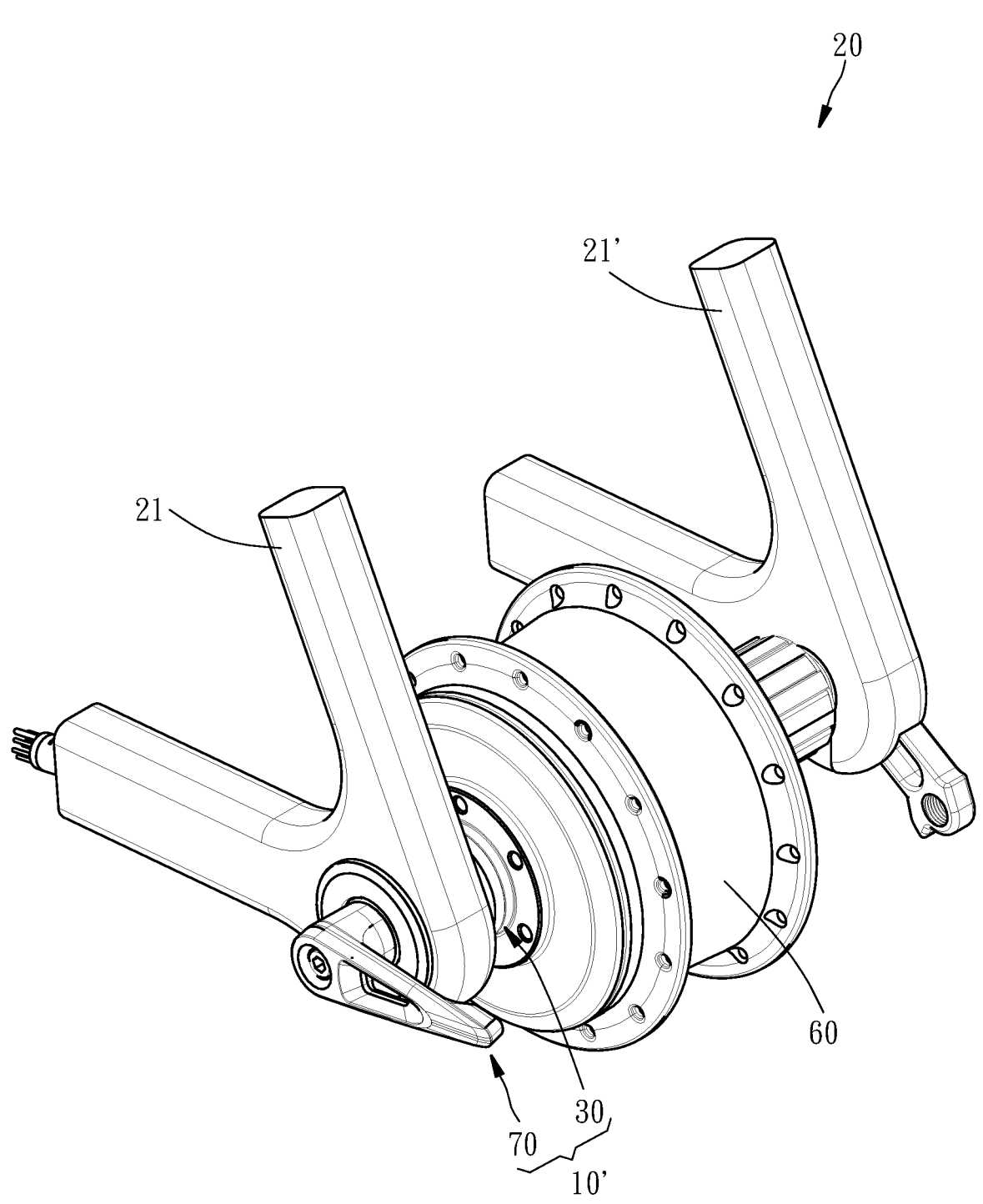
FIG. 8 is a perspective view of a second embodiment.
Figure 9:
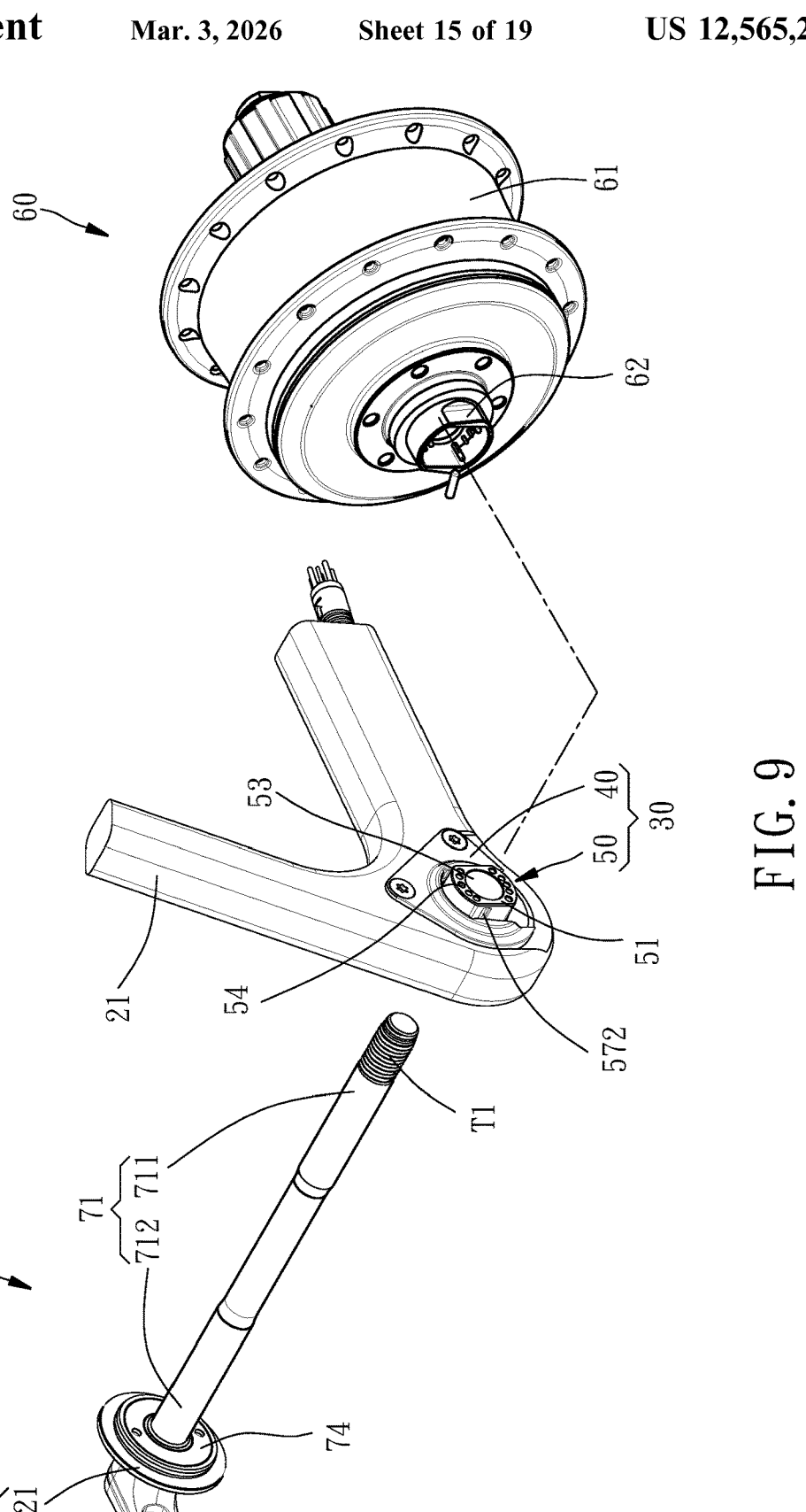
FIG. 9 is an exploded view of FIG. 8.
Figure 10:
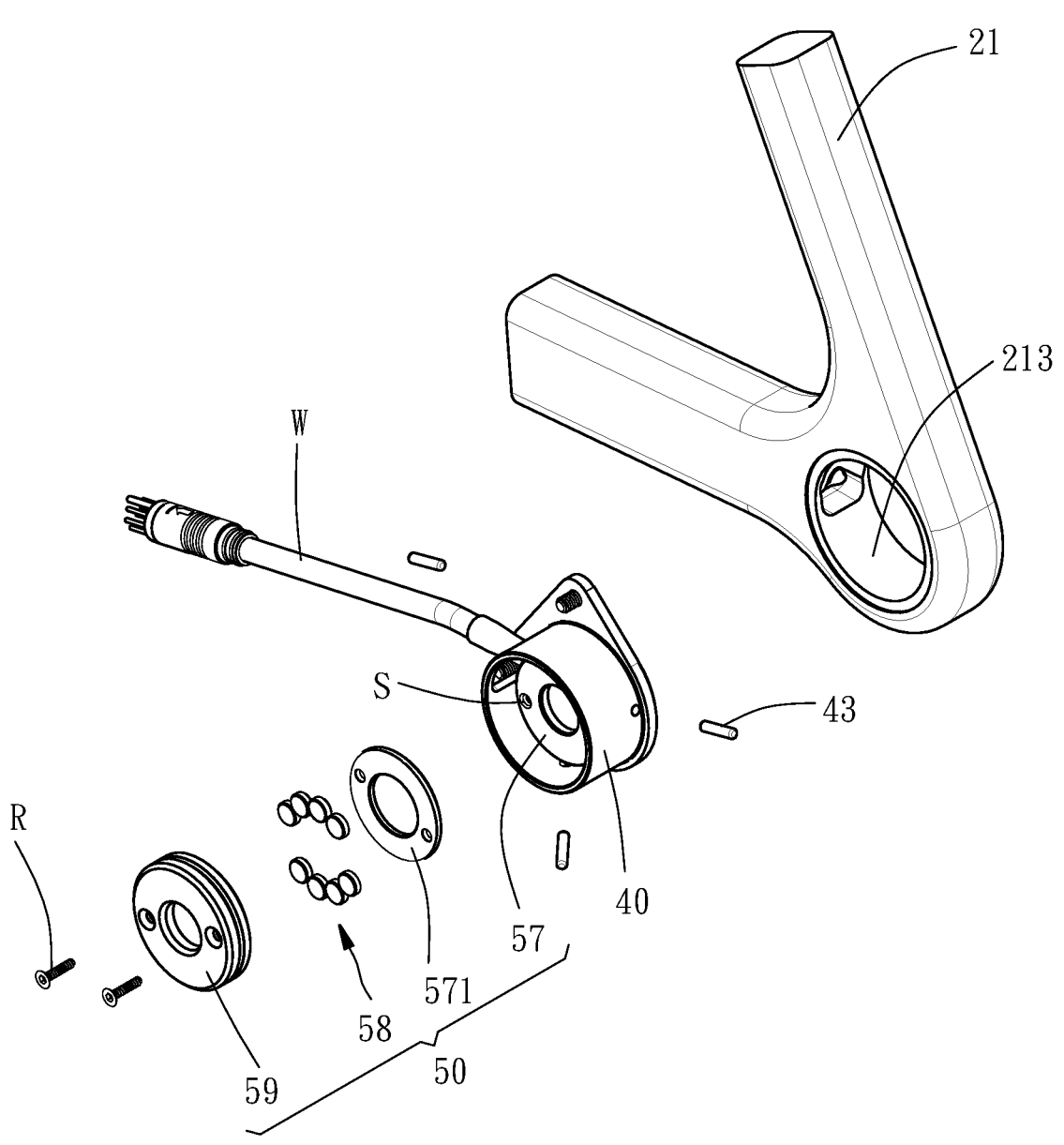
FIG. 10 is another exploded view of FIG. 9.

The present invention further provides a second embodiment, referring to FIG. 8 to FIG. 10. The second embodiment provides a bicycle core shaft assembly 10' having an electrical connector, which can be combined with a wheel hub motor 60 as a whole. The bicycle core shaft assembly 10' includes a first electrical connector 30 and a core shaft 70.

The first electrical connector 30 is detachably installed in a left rear fork 21 of a bicycle frame 20, and includes a fixed seat 40 and an inserted seat 50. The fixed seat 40 is hollow in shape, and fastened to a rear wheel installation portion 213 of the bicycle frame 20 by a plurality of screws R. The fixed seat 40 is further provided with three fixed pins 43.

The inserted seat 50 is disposed in the fixed seat 40 in a way that the inserted seat 50 is movable back and forth. The inserted seat 50 is hollow in shape, and has a first end surface 51, a second end surface 52 opposite to the first end surface 51 (shown in FIG. 11C), and a core shaft installation hole 53 penetrating through the first end surface 51 and the second end surface 52. The first end surface 51 is provided with a set of electrically conductive structure 54. The electrically conductive structure 54 in this embodiment is a set of POGO PIN female terminal connectors. The electrically conductive structure 54 is electrically connected to an electric wire W. The electrically conductive structure 54 is arranged to transmit the power signal the wheel hub motor 60 needs, and transmit each detected signal of the operating wheel hub motor 60 to the exterior. The inserted seat 50 structurally includes an annular base 57, an annular iron sheet 571, a plurality of first magnetically attaching members 58, and an end cap 59. The aforementioned first end surface 51 and the set of electrically conductive structure 54 are both located at the annular base 57. The annular base 57 is provided on a side thereof opposite to the first end surface 51 with two threaded holes S, and the annular base 57 is further provided on the outer peripheral surface thereof with three positioning grooves 572. Only one of the positioning grooves 572 is shown in FIG. 9. The positioning groove 572 has two opposite blocking positions. The terminal ends of the fixed pins 43 are located in the positioning grooves 572 for limiting the scope of the displacement of the inserted seat 50. The annular iron sheet 571 is disposed on the side of the annular base 57 opposite to the first end surface 51. The first magnetically attaching members 58 in this embodiment are eight magnets. The magnets are mounted on the annular iron sheet 571, which means the annular iron sheet 571 is disposed between the annular base 57 and the first magnetically attaching members 58. The amount of the magnet can be increased or decreased according to the requirement. The annular iron sheet 571 is arranged for remagnetization, strengthening the overall magnetic attraction. The end cap 59 is also hollow in shape, and has an annular recess 591 (shown in FIG. 11A). The annular recess 591 accommodates the first magnetically attaching members 58 and the annular iron sheet 571. The end cap 59 is fastened to the annular base 57 by screws R. The hollow portions of the end cap 59 and the annular base 57 collectively form the aforementioned core shaft installation hole 53.

Figure 11A:
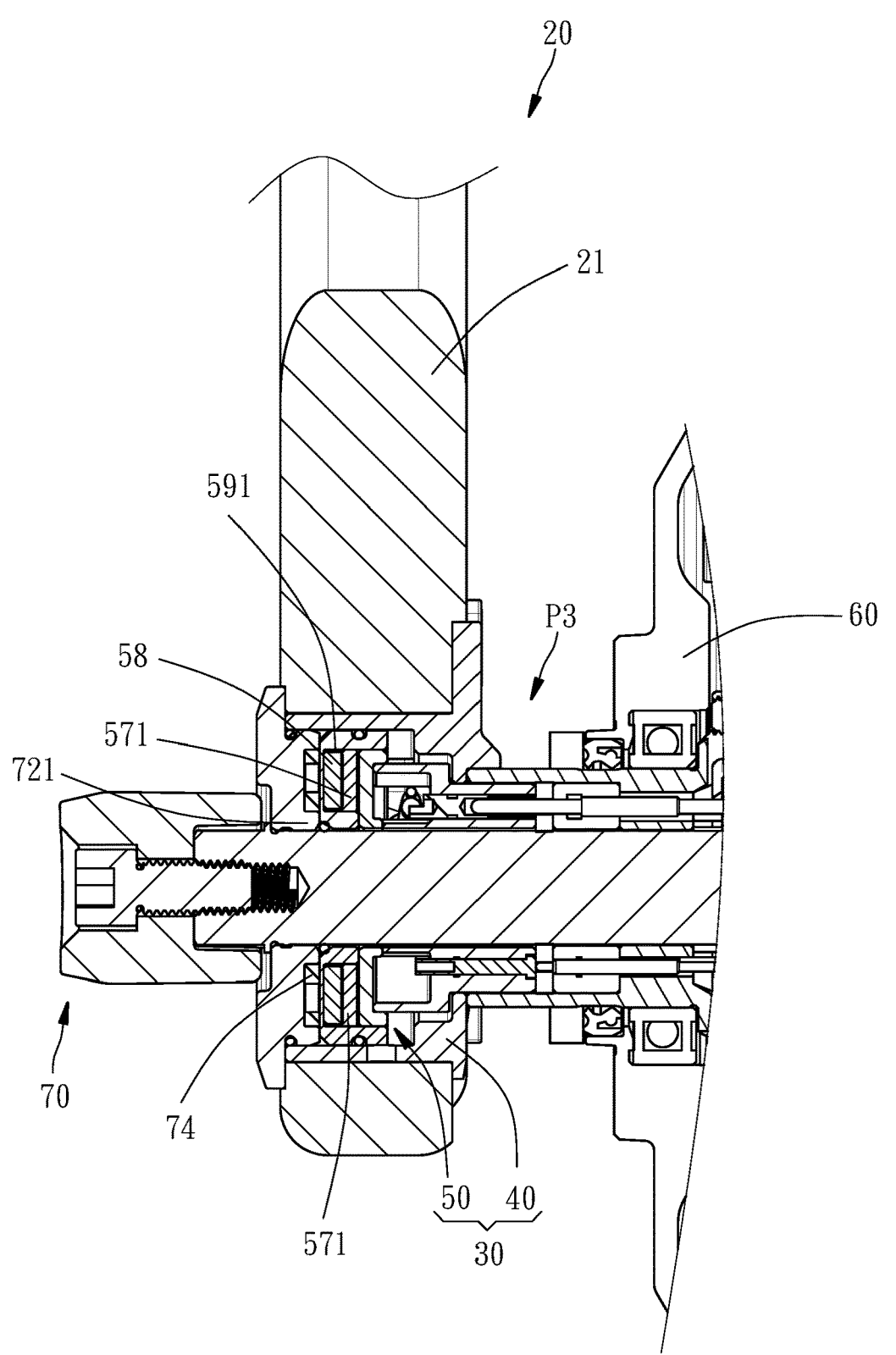
FIG. 11A to FIG. 11C are partial sectional views of FIG. 8 for showing the motion of detaching a core shaft.
Figure 11B:
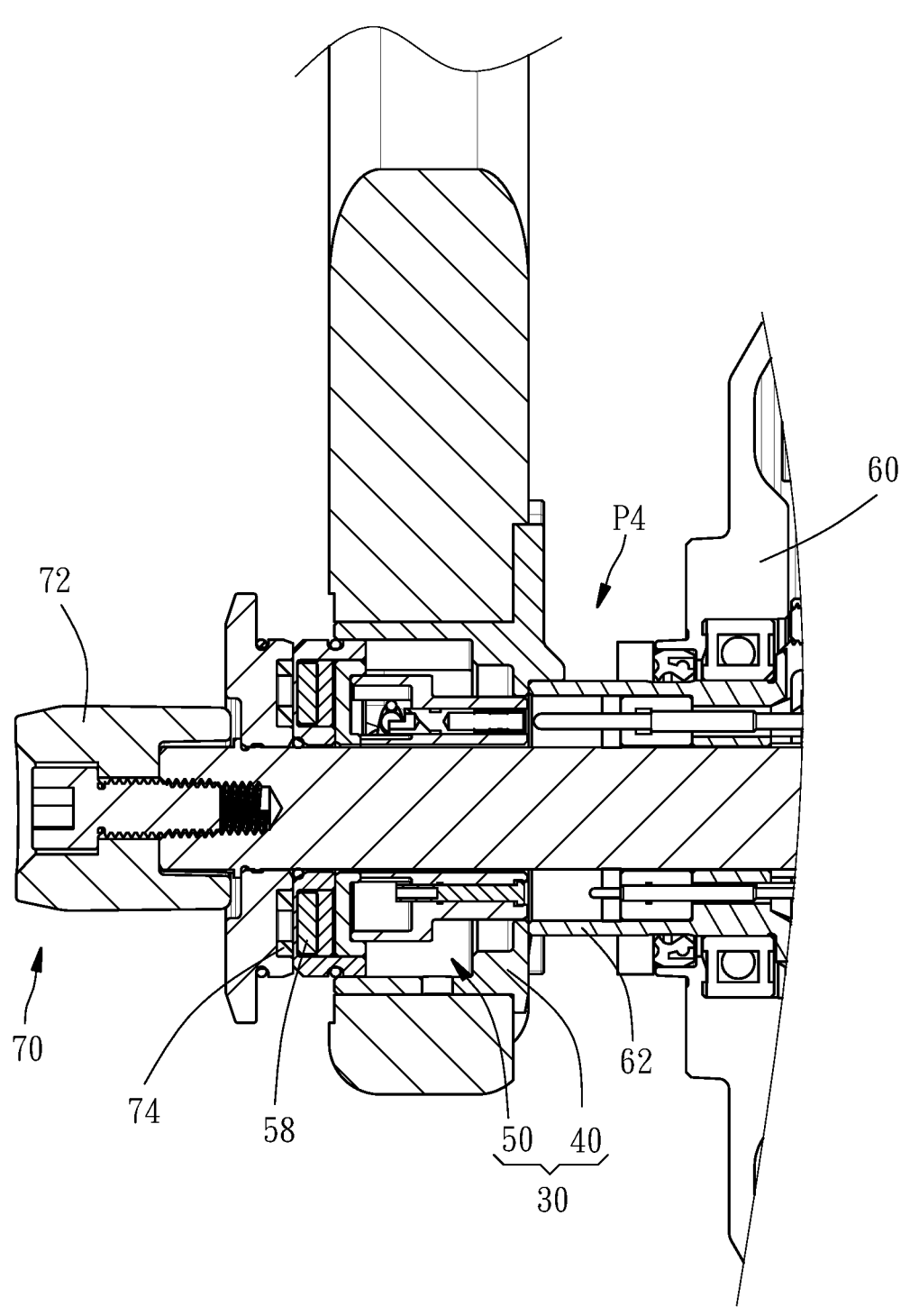

Referring to FIG. 9 particularly, the core shaft 70 structurally includes a shaft rod 71, a driving member 72 and a second magnetically attaching member 74. The shaft rod 71 includes a first end portion 711, and a second end portion 712 opposite to the first end portion 711. The first end portion 711 is provided with an external thread structure T1. The driving member 72 is combined with the second end portion 712. In this embodiment, the driving member 72 is a quick-release handle. The quick-release handle includes a sleeve portion 721 and a pulled portion 722. The pulled portion 722 is connected with the sleeve portion 721. The sleeve portion 721 of the quick-release handle is combined with the second end portion 712 of the shaft rod 71. The second magnetically attaching member 74 is annular in shape, mounted on the sleeve portion 721, and faces toward the first magnetically attaching members 58, as shown in FIG. 11A. In this embodiment, the second magnetically attaching member 74 is made of ferromagnetic material, which is attracted to the first magnetically attaching members 58. When the core shaft 70 is inserted in the core shaft installation hole 53 of the inserted seat 50 of the first electrical connector 30, by the magnetic attraction between the second magnetically attaching member 74 and the first magnetically attaching members 58, the core shaft 70 can drive the inserted seat 50 to move back and forth between an electrically connecting position P3 as shown in FIG. 11A and an electrically disconnecting position P4 as shown in FIG. 11B. When the inserted seat 50 is located at the electrically connecting position P3, the set of electrically conductive structure 54 of the inserted seat 50 is electrically connected with a second electrical connector 62 of the wheel hub motor 60. When the inserted seat 50 is located at the electrically disconnecting position P4, the set of electrically conductive structure 54 of the inserted seat 50 is electrically disconnected from the second electrical connector 62 of the wheel hub motor 60.

It should be mentioned that in some situations, the first magnetically attaching member 58 may be made of ferromagnetic material, and the second magnetically attaching member 74 is a magnet. The core shaft 70 may be a non-quick-release core shaft, unlimited to this embodiment.

Referring to FIG. 9, the wheel hub motor 60 is fixed between the left rear fork 21 and the right rear fork 21' of the bicycle frame 20, and connected with the electrically conductive structure 54 of the inserted seat 50 of the first electrical connector 30 by the second electrical connector 62. The wheel hub motor 60 has a motor main body 61. The aforementioned second electrical connector 62 is disposed on a side of the motor main body 61 facing toward the first electrical connector 30.

In practical usage, when the user installs the wheel hub motor 60 between the left rear fork 21 and the right rear fork 21' of the bicycle frame 20, the user can start to insert the core shaft 70 into the core shaft installation hole 53 of the inserted seat 50 of the first electrical connector 30 disposed in the left rear fork 21 to pass through the center of the wheel hub motor 60 and the right rear fork 21' in order, and at last fasten the core shaft 70 to the right rear fork 21' by screws R. The fastened structure is as shown in FIG. 8 and FIG. 11A. In the process that the core shaft 70 is inserted into the inserted seat 50, when the sleeve portion 721 and the second magnetically attaching member 74 of the core shaft 70 contact the inserted seat 50, the sleeve portion 721 of the core shaft 70 pushes the inserted seat 50 to move from the electrically disconnecting position P4 to the electrically connecting position P3, thereby electrically connecting the first electrical connector 30 with the second electrical connector 62 of the wheel hub motor 60.

Figure 11C:
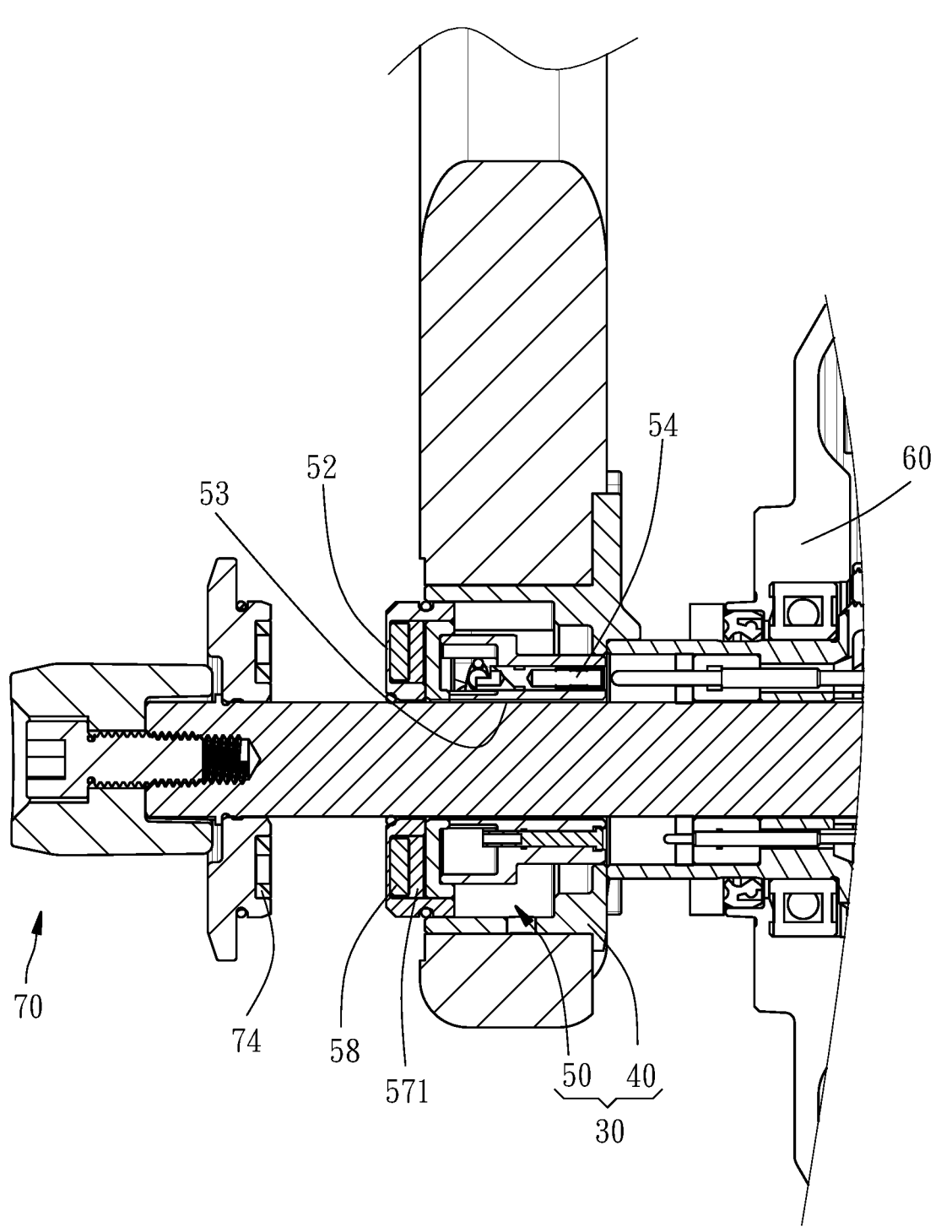

After that, when the user wants to detach the core shaft 70, the user can rotate the core shaft 70 out by the driving member 72 of the core shaft 70. During the movement of the core shaft 70, by the magnetic attraction between the second magnetically attaching member 74 and the first magnetically attaching members 58, the core shaft 70 simultaneously drives the inserted seat 50 to move from the electrically connecting position P3 to the electrically disconnecting position P4 as shown in FIG. 11B, and then the user can continue drawing out the core shaft 70. At this time, the fixed pins 43 of the fixed seat 40 are blocked in the positioning grooves 572 of the inserted seat 50, so the core shaft 70 and the inserted seat 50 don't move simultaneously any more, as shown in FIG. 11C. Under the condition of overcoming the magnetic attraction, the user can continue drawing out the core shaft 70 until the core shaft 70 is completely separated from the inserted seat 50, so that the user can detach the wheel hub motor 60.

By the structural configuration of the bicycle core shaft assembly 10' of the second embodiment, the volume of the first electrical connector 30 can be effectively reduced, and the normal core shaft structure is also applicable thereto. All of the above are the key points of this embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electrical connector, which is detachably installed in a lower fork of a bicycle frame, the electrical connector comprising a fixed seat and an inserted seat, the fixed seat being installed in the lower fork, the fixed seat being hollow in shape, the inserted seat being inserted in the fixed seat in a way that the inserted seat is movable back and forth, the inserted seat having a first end surface, a second end surface opposite to the first end surface, and a core shaft installation hole penetrating through the first end surface and the second end surface, the first end surface of the inserted seat being provided with an electrically conductive structure.

2. The electrical connector as claimed in claim 1, wherein the core shaft installation hole is provided on an inner wall thereof with an annular pushing groove in a way that the inserted seat is enabled through the annular pushing groove to be driven to move in a direction from the first end surface to the second end surface.

3. The electrical connector as claimed in claim 2, wherein the fixed seat is provided on a side thereof with an electrical connector engaging portion; the electrical connector engaging portion is hollow in shape and has a first inner wall, a second inner wall and an upper inner wall connecting upper ends of the first inner wall and the second inner wall; the first inner wall and the second inner wall are arranged parallel to each other.

4. The electrical connector as claimed in claim 1, wherein a direction of electrical connection of the electrically conductive structure is parallel to an axis of the core shaft installation hole.

5. The electrical connector as claimed in claim 1, wherein the inserted seat further comprises a gripped portion for a user to grip the gripped portion to pull the inserted seat to move in a direction from the first end surface to the second end surface, so as to make the electrically conductive structure electrically disconnected.

6. The electrical connector as claimed in claim 1, wherein the inserted seat comprises an annular base and at least one first magnetically attaching member; the first end surface and the electrically conductive structure are located at the annular base; the at least one first magnetically attaching member is disposed on the annular base.

7. The electrical connector as claimed in claim 6, wherein the at least one first magnetically attaching member is a plurality of magnets; the inserted seat further comprises an annular iron sheet; the annular iron sheet is disposed between the annular base and the magnets.

8. The electrical connector as claimed in claim 6, wherein the annular base is provided on an outer peripheral surface thereof with a positioning groove; the fixed seat is further provided with a fixed pin; a terminal end of the fixed pin is located in the positioning groove.

9. A bicycle core shaft assembly comprising:
  a first electrical connector, which is detachably installed in a lower fork of a bicycle frame, the first electrical connector comprising a fixed seat and an inserted seat, the fixed seat being installed in the lower fork, the fixed seat being hollow in shape, the inserted seat being inserted in the fixed seat in a way that the inserted seat is movable back and forth, the inserted seat having a first end surface, a second end surface opposite to the first end surface, and a core shaft installation hole penetrating through the first end surface and the second end surface, the first end surface of the inserted seat being provided with an electrically conductive structure;
  a core shaft disposed in the core shaft installation hole, the inserted seat being controlled by the core shaft to move in a direction from the first end surface to the second end surface.

10. The bicycle core shaft assembly as claimed in claim 9 further comprising:

a wheel hub motor, which is fixed to the lower fork and connected with the fixed seat of the first electrical connector, the wheel hub motor comprising a motor main body and a second electrical connector, the second electrical connector being disposed on a side of the motor main body;
wherein the inserted seat is able to be driven to move back and forth between an electrically connecting position and an electrically disconnecting position; when the inserted seat is located at the electrically connecting position, the electrically conductive structure of the inserted seat is electrically connected with the second electrical connector; when the inserted seat is located at the electrically disconnecting position, the electrically conductive structure of the inserted seat is electrically disconnected from the second electrical connector.

11. The bicycle core shaft assembly as claimed in claim 9, wherein the inserted seat comprises an annular base and at least one first magnetically attaching member; the first end surface and the electrically conductive structure are located at the annular base; the at least one first magnetically attaching member is disposed on the annular base.

12. The bicycle core shaft assembly as claimed in claim 11, wherein the at least one first magnetically attaching member is a plurality of magnets; the inserted seat further comprises an annular iron sheet; the annular iron sheet is disposed between the annular base and the magnets.

13. The bicycle core shaft assembly as claimed in claim 9, wherein the annular base is provided on an outer peripheral surface thereof with a positioning groove; the fixed seat is further provided with a fixed pin; a terminal end of the fixed pin is located in the positioning groove.

14. The bicycle core shaft assembly as claimed in claim 11, wherein the core shaft comprises:
  a shaft rod comprising a first end portion and a second end portion opposite to the first end portion;
  a driving member combined with the second end portion;
  a second magnetically attaching member disposed on the driving member and facing toward the at least one first magnetically attaching member.

*     *     *     *     *